United States Patent

[11] 3,587,321

[72] Inventors Dean H. Couch;
George W. Burdette, China Lake, Calif.
[21] Appl. No. 886,229
[22] Filed Dec. 18, 1969
[45] Patented June 28, 1971
[73] Assignee The United States of America as represented by the Secretary of the Navy.

[54] GLASS PRESSURE MEASURING APPARATUS
4 Claims, 4 Drawing Figs.

[52] U.S. Cl. .................................................. 73/418
[51] Int. Cl. .................................................. G01l 7/04
[50] Field of Search ............................................ 73/411, 418

[56] References Cited
UNITED STATES PATENTS
3,067,617  12/1962  Buck .......................... 73/418X Primary Examiner—Donald O. Woodiel
Attorneys—R. S. Sciascia and Roy Miller ABSTRACT: An all glass pressure measuring device for indicating pressure buildup of certain materials under predetermined environmental conditions which comprises a closed glass sample cylinder having a Bourdon gauge and a fill tube sealed to the top thereof. A glass housing open at one end is sealed to the top so as to surround said fill tube and Bourdon gauge. A small mirror is attached to the closed end of the Bourdon tube gauge and another mirror is attached to the outside of the housing which acts as a reference mirror. A change in pressure causes the mirror on the Bourdon gauge to flash a beam of light which is recorded from a scale on a measuring apparatus.

PATENTED JUN 28 1971

Dean H. Couch
George W. Burdette
INVENTORS

BY Roy Miller

Attorney

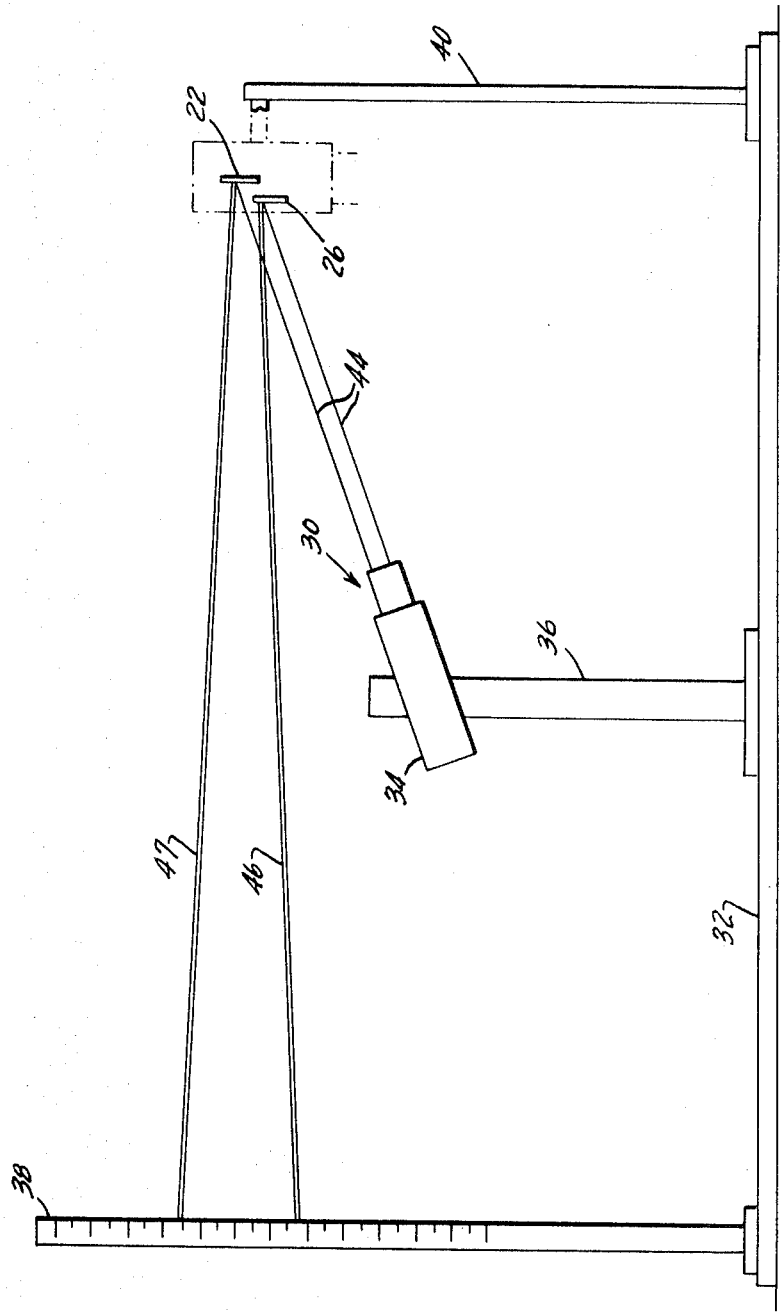

GLASS PRESSURE MEASURING APPARATUS

GOVERNMENT INTEREST

The invention described herein may be manufactured and used by or for the Government of the United States of America for governmental purposes without the payment of any royalties thereon or therefor.

BACKGROUND OF THE INVENTION

This invention relates to an all glass pressure measuring device.

For measuring pressure exerted by gases or vapors as in boilers, air tanks, etc., the well-known manometer is generally used. Multimetal systems are also used, but these devices are often plagued with leaks. The present invention provides a positively sealed system which is all glass thereby eliminating unnecessary compatibility problems such as mercury and dissimilar metals. It is therefore the general object of this invention to provide a pressure measuring device which is simple and easy to construct and the result can be visually observed.

DESCRIPTION OF THE DRAWING

FIG. 4 is a schematic illustrating the mode of operation of the invention.

DESCRIPTION OF THE INVENTION

Figure 1:
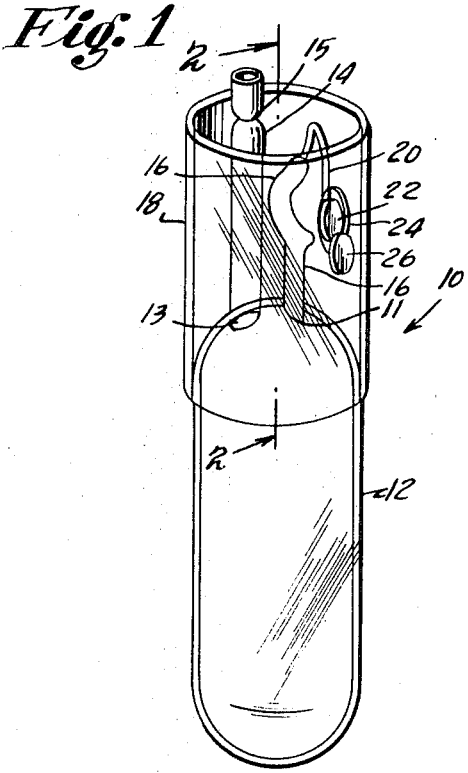
FIG. 1 is an isometric of the present invention.
Figure 2:
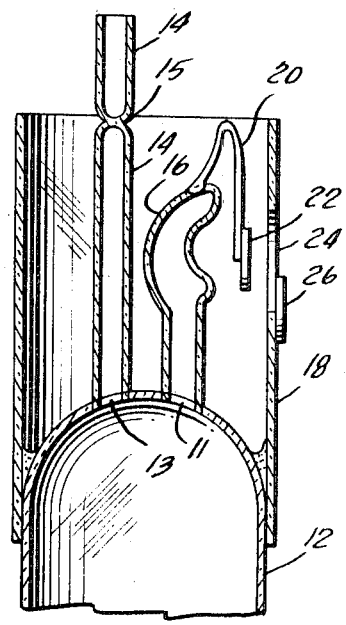
FIG. 2 is a section taken through 2-2 of FIG. 1.

Referring now to the drawing there is shown in FIG. 1 the pressure measuring device 10 which comprises a hollow glass cylinder 12, closed at the top and bottom, about 50 mm. in diameter and of any desired length. A hollow fill tube 14 is torch sealed to 32 edges of an aperture 13 provided in the top of cylinder 12 so as to communicate with the interior of cylinder 12 for filling purposes. A glass Bourdon gauge 16 is torch sealed at its open end to the edges of a second aperture 17 provided in cylinder 12 which communicates with the interior of said cylinder. A glass housing 18 is secured by torch sealing or other suitable means to the outer wall of cylinder 12 so as to surround or guard Bourdon gauge 16 and fill tube 14. Housing 18 is open at the top. Bourdon tube gauge 16 is closed at one end with a solid curved glass tip 20 on which a first mirror 22 is secured by torch seal, cement, or other suitable means. An open window 24 is provided in the wall of housing 18 opposite said mirror 22 to permit uninterrupted reflection of light from mirror 22. A second mirror 26 is positioned at the bottom of window 24 so that the top of mirror 26 is in substantial alignment with the bottom of first mirror 22. Window 24 permits the passage of light from first mirror 22 thus minimizing aberration. In operation the pressure device is calibrated by means of a laser pressure reading apparatus 30 as shown in FIG. 4 since manufacture of the glass Bourdon gauges is not yet standardized. Cylinder or container 12 is filled through tube 14 which is then torch sealed at point 15. Device 10 is placed in the desired test environment and at intervals brought into the laboratory and the temperature read. Generally, the pressure is read at 25° C. As shown in FIG. 4 pressure reading apparatus 30 provided comprising a base 32, a laser 34 mounted on stand 36 which is positioned about midway on said base 34. Near one end of base 34 a millimeter scale 38 is mounted upright and at the other end a holder 40 is positioned to which said pressure measuring device is suitably secured. In calibrating the device laser beam 44 is directed to and split by second mirror 26 (reference) and first mirror 22 (movable). The lower half of split beam designated 46 is reflected from mirror 26 to scale 38 as a zero or reference point. The upper part of the split beam designated 47 from mirror 22 is reflected also onto scale 38 and moves upward as pressure increases in cylinder 12 creating a straightening effect on the Bourdon gauge. The reading difference between the reference beam 46 and the Bourdon gauge light beam 47 is then made and the pressure calculated. The degree of movement of the Bourdon gauge is proportional to the applied pressure. The glass Bourdon gauge also acts as a safety release because it will break at pressures slightly above the design value of 50 p.s.i.g.

Figure 3:
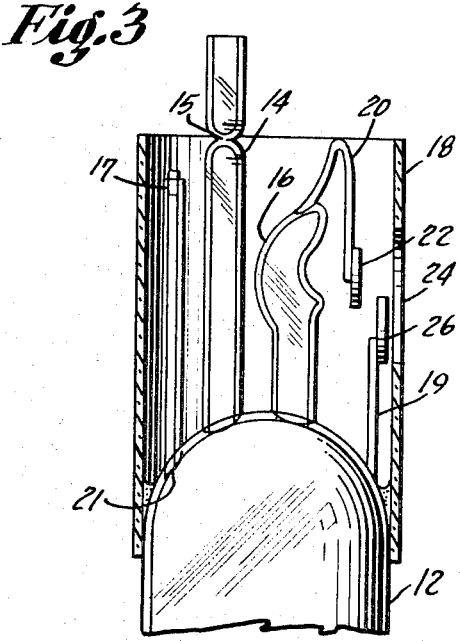
FIG. 3 is a section showing another embodiment.

In another embodiment shown in FIG. 3 a hollow breakoff seal 17 for sample or gas removal from cylinder 12 is torch sealed to a third aperture 21 positioned on the top of cylinder 12 or may be positioned on cylinder 12 above the level of the material contained therein. It provides a simple means for quick and easy removal of gas or material for test purpose. Also, as shown in FIG. 3, mirror 26 can be affixed to a solid glass rod 19 which is torch sealed to the dome or top of cylinder 12 and positioned so as to permit the light beam to pass unimpeded through window 24 in housing 18. Rod 19 provides a firm attachment for mirror 26 and thereby avoids movement of the mirror which may occur under certain environmental conditions; particularly if the mirror is cemented to housing 18. In this embodiment housing 18 was made of optically clear plastic and clamped to the outside of cylinder 12 thereby effectively protecting the dome of said cylinder.

The Bourdon gauge is commercially available for the measurement of liquid or gas pressure. It consists of a curved tube of elliptical cross section. One end of the tube is closed and the application of pressure to the other end causes the curvature to be reduced slightly, and the indicator to be operated. Over a certain range, the degree of movement obtained is proportional to the applied pressure.

The present invention can be positively sealed and the sealed filling tube can be broken off inside a piece of plastic tubing so the total sample, gases, and liquid can be transferred to analyses equipment. The preferred material for all the components of this device is glass so that the sample along with any reaction can be visually observed. This device can be easily handled in an inert and/or anhydrous atmosphere.

The herein described pressure measuring device can be constructed of most any type glass desired and the size can be altered to suit the test being run. Some of the advantages of this device are (1) the vessel is all glass, thus eliminating unnecessary compatibility problems with such things as mercury and dissimilar metals; (2) the apparatus is torch sealed, thereby eliminating any possibility of leaks; (3) the apparatus is much cheaper to construct than others on the market; and (4) the device can be reused.

The present invention may be well suited for studies including corrosion rates, stress corrosion, tensile samples, welding effects, surface area effects, dissimilar metals, compatibility and storage-seating tests.

We claim:

1. An all glass pressure measuring device comprising
    a hollow cylinder closed at each end and having a first aperture positioned near the center of the front end of said cylinder, and a second aperture positioned next to said first aperture;
    a Bourdon gauge having its open end sealed to the edges of said first aperture so as to communicate with the interior of said cylinder;
    a filling tube having one end sealed to the edges of said second aperture so as to communicate with the interior of said cylinder;
    a first mirror secured to the solid tip of said Bourdon gauge whereby light is reflected with any movement of said Bourdon gauge;
    a cylindrical housing open at both ends having one end sealed to the walls of the front end of said cylinder so as to guard said filling tube and said Bourdon gauge; said housing having an open window positioned opposite said first mirror;
    a second mirror secured to the base of said window so that the top edge of said second mirror is substantially in alignment with the bottom edge of said first mirror, whereby a light beam reflected from said second mirror is used as a zero reference with respect to said light beam reflected from said first mirror by the movement of said Bourdon gauge.

2. The device in accordance with claim 1 wherein a third aperture is provided on the top of said cylinder and a hollow seal tube sealed to the edges of said third aperture so as to communicate with the interior of said cylinder.

3. The device in accordance with claim 1 wherein said second mirror is secured to a solid glass rod firmly secured to the top of said cylinder.

4. The device in accordance with claim 1 wherein said housing consists essentially of optically clear plastic and is clamped onto the outside of said cylinder.